United States Patent
Lee et al.

(10) Patent No.: US 7,796,695 B2
(45) Date of Patent: Sep. 14, 2010

(54) METHOD FOR ALLOCATING DATA AND PILOTS, AND TRANSMITTING METHOD AND DEVICE AND RECEIVING METHOD AND DEVICE USING THE SAME IN ORTHOGONAL FREQUENCY DIVISION MULTIPLE ACCESS SYSTEM

(75) Inventors: Yu-Ro Lee, Daejeon (KR); Jong-Ee Oh, Daejeon (KR); Choong-Il Yeh, Daejeon (KR); Hyoung-Soo Lim, Daejeon (KR); Dong-Seung Kwon, Daejeon (KR)

(73) Assignees: Electronics & Telecommunication Research Institute (KR); Samsung Electronics Co., Ltd. (KR); KT Corporation (KR); SK Telecom Co., Ltd. (KR); KTFreetel Co., Ltd. (KR); Hanaro Telecom., Inc. (KR)

( * ) Notice: Subject to any disclaimer, the term of this patent is extended or adjusted under 35 U.S.C. 154(b) by 727 days.

(21) Appl. No.: 10/583,593

(22) PCT Filed: Jul. 22, 2004

(86) PCT No.: PCT/KR2004/001835

§ 371 (c)(1),
(2), (4) Date: Apr. 2, 2007

(87) PCT Pub. No.: WO2005/060108

PCT Pub. Date: Jun. 30, 2005

(65) Prior Publication Data

US 2007/0263743 A1 Nov. 15, 2007

(30) Foreign Application Priority Data

Dec. 19, 2003 (KR) ...................... 10-2003-0094069

(51) Int. Cl.
*H04K 1/10* (2006.01)
(52) U.S. Cl. ..................................................... 375/260
(58) Field of Classification Search ................. 370/210; 375/232, 260, 267
See application file for complete search history.

(56) References Cited

U.S. PATENT DOCUMENTS

| 7,397,838 B2 * | 7/2008 | Laroia et al. ................. 375/132 |
| 7,418,039 B2 * | 8/2008 | Simmonds ................... 375/260 |
| 2006/0072678 A1 * | 4/2006 | Hadad ......................... 375/260 |
| 2008/0310484 A1 * | 12/2008 | Shattil ......................... 375/146 |

FOREIGN PATENT DOCUMENTS

| KR | 2001-0002585 | 1/2001 |
| WO | WO 2004/038972 | 5/2004 |

* cited by examiner

*Primary Examiner*—David C Payne
*Assistant Examiner*—Leon-Viet Q Nguyen
(74) *Attorney, Agent, or Firm*—The Farrell Law Firm, LLP

(57) ABSTRACT

Disclosed is a method for allocating data and pilots, a transmitting method and device, a receiving method and device in an OFDMA system. A terminal partitions subcarrier groups and symbols from an uplink channel based on a basic pilot pattern generated by a specific reference, receives at least one subchannel based on the partitioned subcarrier groups and symbols, hops the subcarrier groups caused by the subchannel according to hopping patterns, allocates data, and differently positions the pilots per subcarrier group based on the basic pilot pattern. Accordingly, the probability of pilot collision between adjacent cells is reduced, and accuracy of channel estimation is increased through boosting the pilot subcarrier power.

21 Claims, 6 Drawing Sheets

Number of basic pilot patterns

METHOD FOR ALLOCATING DATA AND PILOTS, AND TRANSMITTING METHOD AND DEVICE AND RECEIVING METHOD AND DEVICE USING THE SAME IN ORTHOGONAL FREQUENCY DIVISION MULTIPLE ACCESS SYSTEM

CROSS REFERENCE TO RELATED APPLICATION

This application claims priority to and the benefit of Korea Patent Application No. 2003-94069 filed on Dec. 19, 2003 in the Korean Intellectual Property Office, the entire content of which is incorporated herein by reference.

BACKGROUND OF THE INVENTION (a) Field of the Invention

The present invention relates to a transmitting and receiving method in an OFDMA (orthogonal frequency division multiple access) system. More specifically, the present invention relates to a method for allocating pilots and data for improving frequency reuse rates in an uplink of an OFDM (orthogonal frequency division multiplex) system.

(b) Description of the Related Art

The present invention relates to a method for allocating pilot subcarriers, and a method and device for transmitting and receiving pilot subcarriers in an OFDMA (orthogonal frequency division multiple access) system. More specifically, the present invention relates to a method for allocating pilot subcarriers of a base station for improving frequency reuse rates in an OFDM (orthogonal frequency division multiplex) system.

(b) Description of the Related Art

In order to realize a BMWS (broadband multimedia wireless service) system which enables reliability of high speed and large-capacity services, OFDM transmission methods for transmitting signals with high data rates in the millimeter wave bandwidths of from several to several tens of GHz have been used.

The OFDM method represents a frequency multiplex system for perform an IFFT (inverse fast Fourier transform) on the data to be transmitted, dividing available bandwidths into a plurality of subcarriers, transmitting them, allowing an OFDM receiver to perform a FFT (fast Fourier transform) on the transmitted subcarriers, and converting them into original data, and it also represents a multiplex communication system for providing a specific orthogonal condition between subcarrier frequencies, and separating respective subcarriers from the receiver irrespective of spectral superposition.

FIG. 1 shows a block diagram of a conventional OFDM system, and configuration and operation of a transmitter and a receiver of the OFDM system will be described with reference to FIG. 1.

An OFDM transmitter 10 comprises a serial/parallel converter 2, a modulator 4, an IFFT (inverse fast Fourier transform) unit 6, a parallel/serial converter 8, and a D/A (digital/analog) converter and filter 12.

The serial/parallel converter 2 converts high-speed transmit data received in series into low-speed parallel data.

The modulator 4 modulates the data parallel-converted by the serial/parallel converter 2 through a predetermined modulation method.

The IFFT unit 6 transforms the data modulated by the modulator 4 into signals on the time axis, and outputs results.

The parallel/serial converter 8 converts the parallel data output by the IFFT unit 6 into serial signals.

The D/A converter and filter 12 converts the serial signals output by the parallel/serial converter 8 into analog signals, filters the analog signals, and outputs filtered results to the receiver through an RF (radio frequency) terminal.

That is, the data symbols output by the serial/parallel converter 2 are modulated by corresponding carriers, OFDM symbols are configured through the IFFT unit 6, and are finally input to the RF terminal transmitted to channels.

Also, the OFDM symbols are transmitted per symbol unity, but they are influenced by previous symbols while being transmitted through a multipath channel. In order to prevent OFDM inter-symbol interference, a CP (cyclic prefix) is provided to the parallel/serial converter 8 so that the CP may be additionally inserted between the adjacent OFDM symbols by establishing a length of the CP to be greater than the maximum delay spreading of a channel.

Next, the OFDM receiver 20 comprises an A/D (analog/digital) converter and filter 29, a serial/parallel converter 28, an FFT (fast Fourier transform) unit 26, a channel estimator 23, a demodulator 24, and a parallel/serial converter 22.

The A/D converter and filter 29 receives the analog signals from the transmitter 10 through the RF terminal, filters the received signals, and converts them into digital signals.

The serial/parallel converter 28 eliminates the CP inserted into the digital data converted by the A/D converter and filter 29, and converts them into parallel signals.

The FFT unit 26 performs an FFT on the time-axis data of the parallel signals converted by the serial/parallel converter 28, and generates frequency-axis data signals.

The channel estimator 23 estimates channel estimates of the frequency-axis data signals transformed by the FFT unit 26 for the purpose of synchronization demodulation of data.

The demodulator 24 uses the channel estimates found by the channel estimator 23 and demodulates the data.

The parallel/serial converter 22 converts the parallel signals demodulated by the demodulator 24 into serial signals.

Since the above-configured OFDM system parallels a predetermined data sequence by the number of subcarriers used for modulation, and modulates the corresponding subcarriers by using the parallel data, the total data rates maintain the original high speed, and the symbol period of the subchannels including the respective subcarriers is increased by the number of subcarriers.

Therefore, the frequency-selective multipath fading channel is approximated as a frequency-nonselective channel with respect to each subchannel, and corresponding distortions can be easily compensated by using a simple receiver.

As described above, the OFDM method has an advantage of reducing complexity of the receiver in the broadband transmission with severe frequency selective fading, and in order to reduce the complexity, the OFDM method uses the CP and eliminates influences caused by delay spreading.

However, as shown in FIG. 2, when the adjacent cells use the same frequency, signals of the first terminal and signals of the second terminal coupled to the first base station are provided to the second base station. Hence, the third terminal coupled to the second base station is interfered by the first and second terminals.

FIG. 3 shows a conventional pilot pattern of an upper frame using a preamble.

The conventional HyperLAN or the IEEE 802.16a uses a preamble to estimate a channel of an uplink.

When mobility of a terminal is provided as shown in FIG. 3, performance for channel estimation is degraded because initial channel estimates are time-varying. Also, when the positions of the terminals of an adjacent base station are provided on the border of the cell, preambles of the adjacent cell are collided and the performance of channel estimation is degraded since the positions of the preambles of all the base stations are the same.

SUMMARY OF THE INVENTION

It is an advantage of the present invention to provide a transmitting method and receiving method in an OFDMA system for reducing degradation of performance of channel estimation caused by mobility and delay spreading, and allowing adjacent cells to use the same frequency in an OFDMA-based uplink channel, by allowing distinguishable cells to have their own specific data and pilot allocation method.

In one aspect of the present invention, a method for allocating pilots and data to an uplink channel in an OFDMA system comprises: i) partitioning subcarrier groups and symbols from the uplink channel based on a basic pilot pattern generated by a specific reference, and allocating at least one subchannel based on the partitioned subcarrier groups and the symbols; ii) hopping the subcarrier groups according to a hopping pattern, and allocating data, the subcarrier groups being caused by the subchannel allocated in i); and iii) differently allocating the pilot per subcarrier group based on the basic pilot pattern from the data hopped in ii). The subcarrier groups are partitioned by a prime number. The subchannel allocated in i) is allocated by at least one subcarrier group on the frequency axis, and by a unit of more than two symbols on the time axis.

The step of ii) comprises using an RS code with the same length as that of the subchannel, and generating the hopping pattern.

The step of iii) comprises: a) partitioning the bandwidth of the uplink channel into a plurality of subcarrier groups having a specific number of subcarriers; and b) allocating a pilot to each subcarrier group, wherein a basic pilot pattern with a different pilot position is generated to each subcarrier group.

In another aspect of the present invention, a method for a transmitter to transmit pilot-inserted transmit data to a receiver through an uplink channel in an OFDMA system comprises: a) receiving a specific subcarrier group and a subchannel of a specific symbol unit by a specific reference, hopping the specific subcarrier group according to a specific hopping pattern to allocate data, and allocating pilots based on a specific pilot pattern from the allocated data; b) transmitting information according to the allocated data and pilots; and c) transmitting the pilot-inserted transmit data to the receiver. The step of a) comprises receiving a subcarrier group and a subchannel with more than two continuous symbols.

The step of b) comprises: d) converting the data and the pilots into respective parallel signals according to the data to be transmitted and the number of pilot subcarriers; e) respectively modulating the parallel data and signals converted in d); and f) receiving the data and the pilot modulated in e), performing an IFFT on the pilot-inserted data based on the data and the pilots allocated in a), and converting them into time domain signals.

In still another aspect of the present invention, a method for receiving pilot-inserted data from a transmitter through an uplink channel in an OFDMA system, comprises: a) converting the data transmitted by the transmitter into frequency domain signals; b) reversely hopping the frequency domain signals converted in a) based on information on the data and the pilot transmitted by the transmitter, wherein the information follows the data allocated by hopping a specific subcarrier group from among the subcarrier groups partitioned based on a specific basic pilot pattern and follows the pilot allocated from the allocated data based on the specific pilot pattern; and c) demodulating the reversely hopped data, and receiving them.

The step of a) comprises: d) filtering the data transmitted by the transmitter, and converting the filtered data into digital signals; e) eliminating a cyclic prefix of the digital signal, and converting them into parallel signals; and f) performing an FFT on the parallel signals and converting them into frequency domain signals.

The step of b) comprises: g) detecting positions of the data and the pilots based on the information of the data and the pilots; h) reversely hopping the detected data; and i) separating the reversely hopped data and pilots based on the positions of the data and the pilots detected in g).

The step of c) comprises: j) estimating a channel on the frequency axis based on the position of the pilot; and k) using the channel estimate in j), and demodulating and receiving the data.

In still yet another aspect of the present invention, a transmitter for transmitting pilot-inserted transmit data to a receiver through an uplink channel in an OFDMA system comprises: a serial/parallel converter for converting data and pilots into parallel signals according to number of pilots and data subcarriers; a modulator for modulating the parallel data and pilots converted by the serial/parallel converter; a hopping pattern controller for receiving a specific subcarrier group and a subchannel of a specific symbol unit by a specific reference, hopping the specific subcarrier group according to a specific hopping pattern to allocate data, allocating pilots based on a specific pilot pattern from the allocated data, and transmitting information caused by the allocated data and pilots to the receiver, wherein the hopping pattern is generated by using an RS code which corresponds to a length of the subchannel; a multiplexer for inserting pilots into the data based on the allocated data and the pilots, and multiplexing them; an IFFT unit for converting the multiplexed frequency domain signals into time domain signals, and outputting the same; a parallel/serial converter for adding a cyclic prefix to the signals output by the IFFT unit, and converting them into serial signals; and a digital/analog converter and filter for converting the serial signals output by the parallel/serial converter into analog signals, filtering them, and transmitting the filtered signals to the receiver through an RF terminal.

In further another aspect of the present invention, a receiver for receiving pilot-inserted transmit data from a transmitter through an uplink channel in an OFDMA system comprises: an A/D converter and filter for converting the data transmitted by the transmitter into digital signals; a serial/parallel converter for eliminating a cyclic prefix from the digital signals, and converting them into parallel signals; an FFT unit for performing an FFT on the parallel signals, and outputting frequency domain signals; a hopping pattern controller for receiving information on the data and the pilots transmitted by the transmitter, detecting positions of the data and pilots from the frequency domain signals output through the FFT unit, and reversely hopping the data from the detected positions of the data, wherein the information follows the data allocated by hopping a specific subcarrier group from among the subcarrier groups partitioned based on a specific basic pilot pattern and follows the pilot allocated from the allocated data based on the specific pilot pattern; a demultiplexer for separating the reversely hopped data and pilots based on the positions of the detected data and pilots; a channel estimator for using the separated pilots and estimating a channel of the separated data; a demodulator for using the estimated channel estimate and demodulating the separated data; and a parallel/serial converter for converting the demodulated parallel data into serial data.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
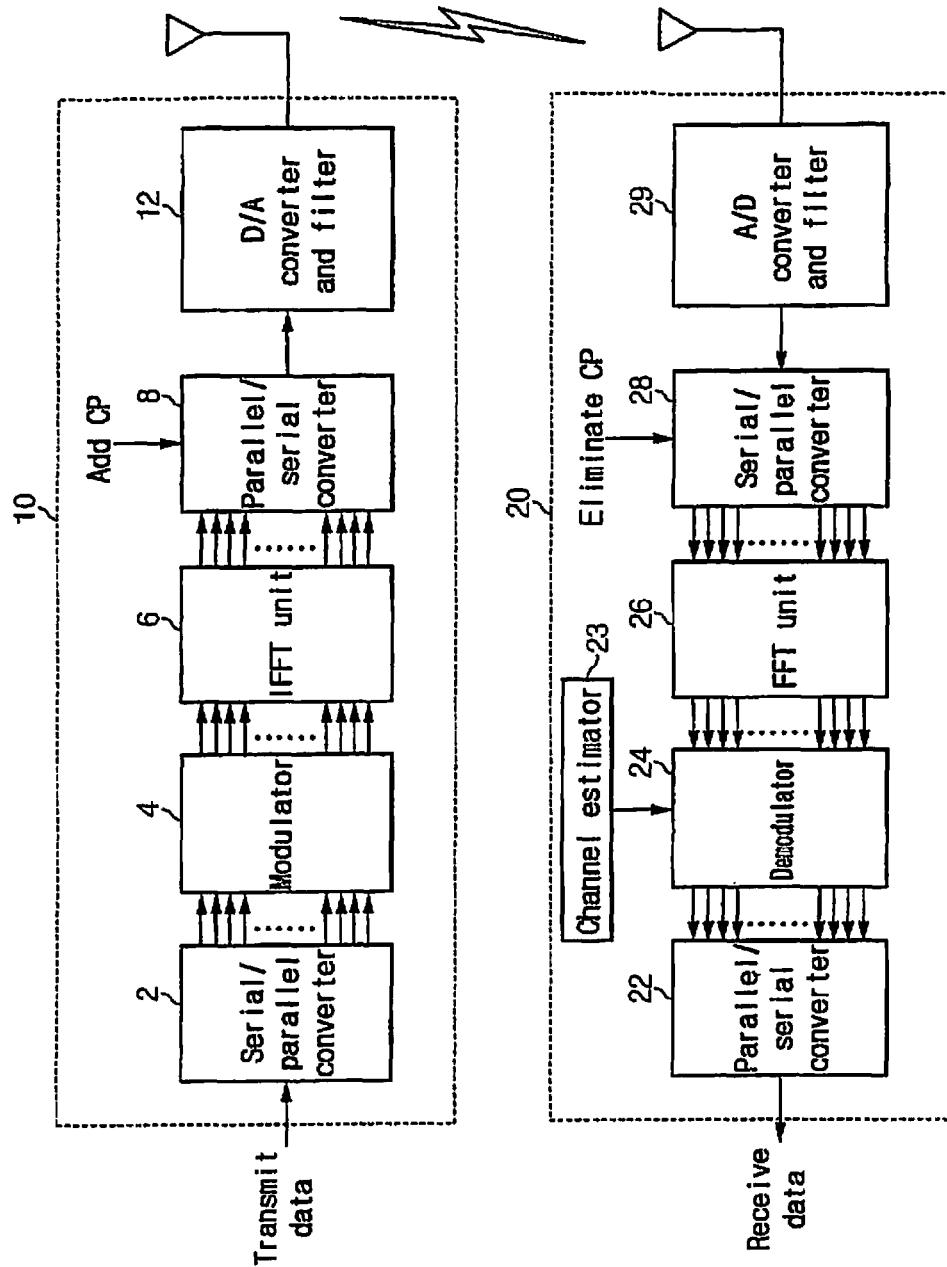
FIG. 1 shows a block diagram of a conventional OFDM system.
Figure 2:
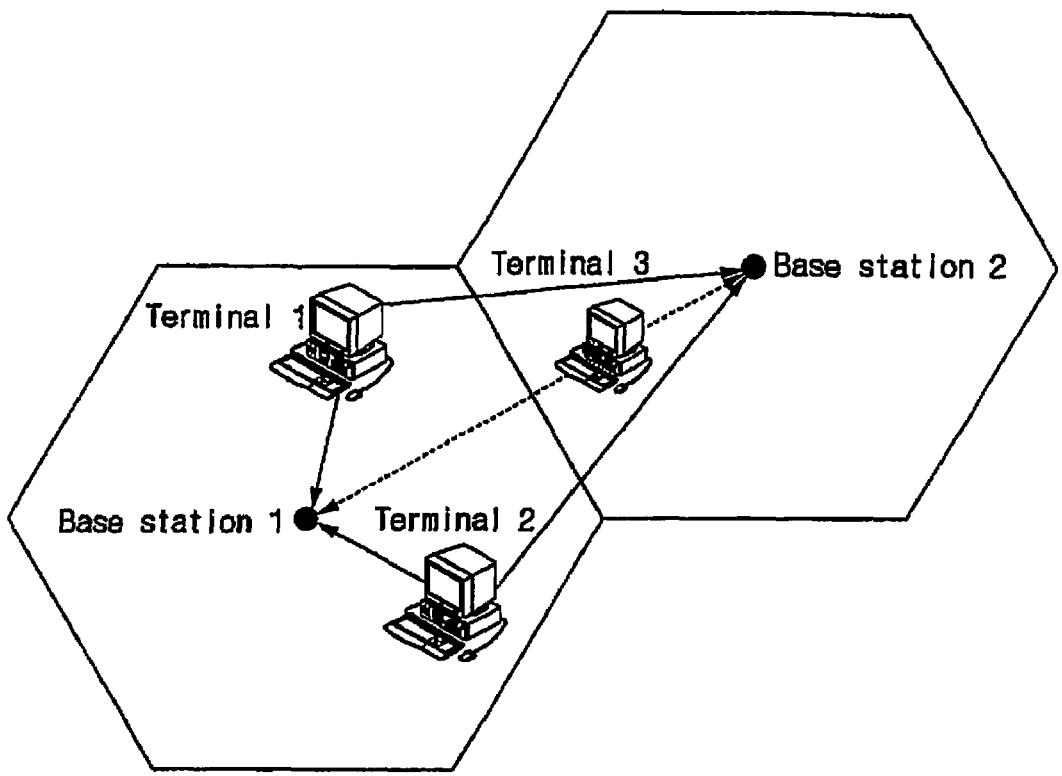
FIG. 2 shows a generation of inter-cell interference signals in a conventional OFDM system.
Figure 3:
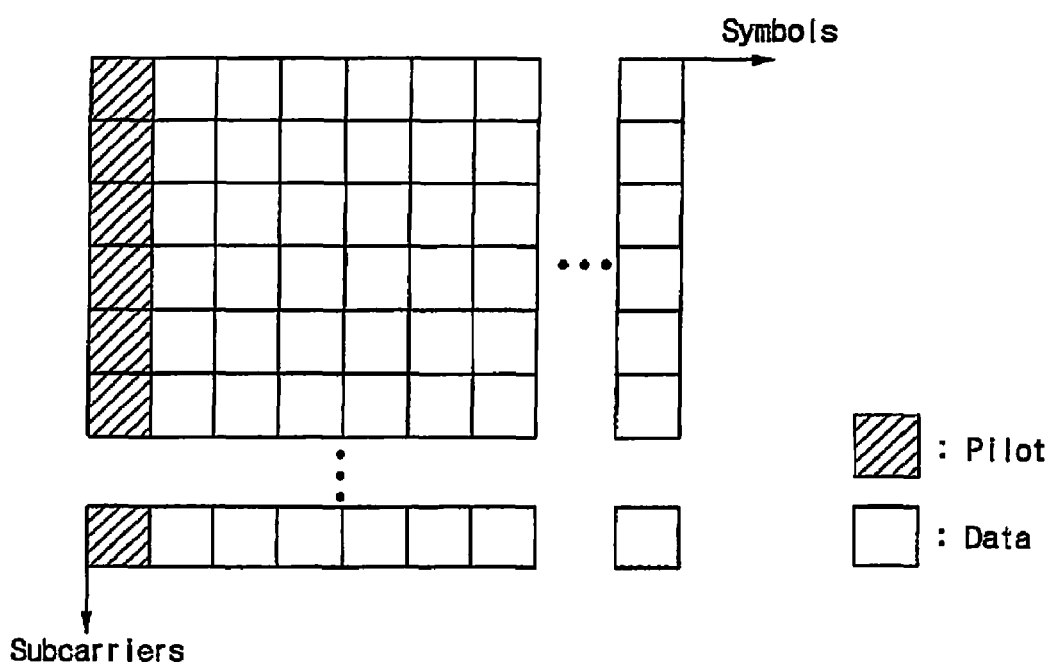
FIG. 3 shows a conventional pilot pattern of an upper frame using a preamble.
Figure 4:
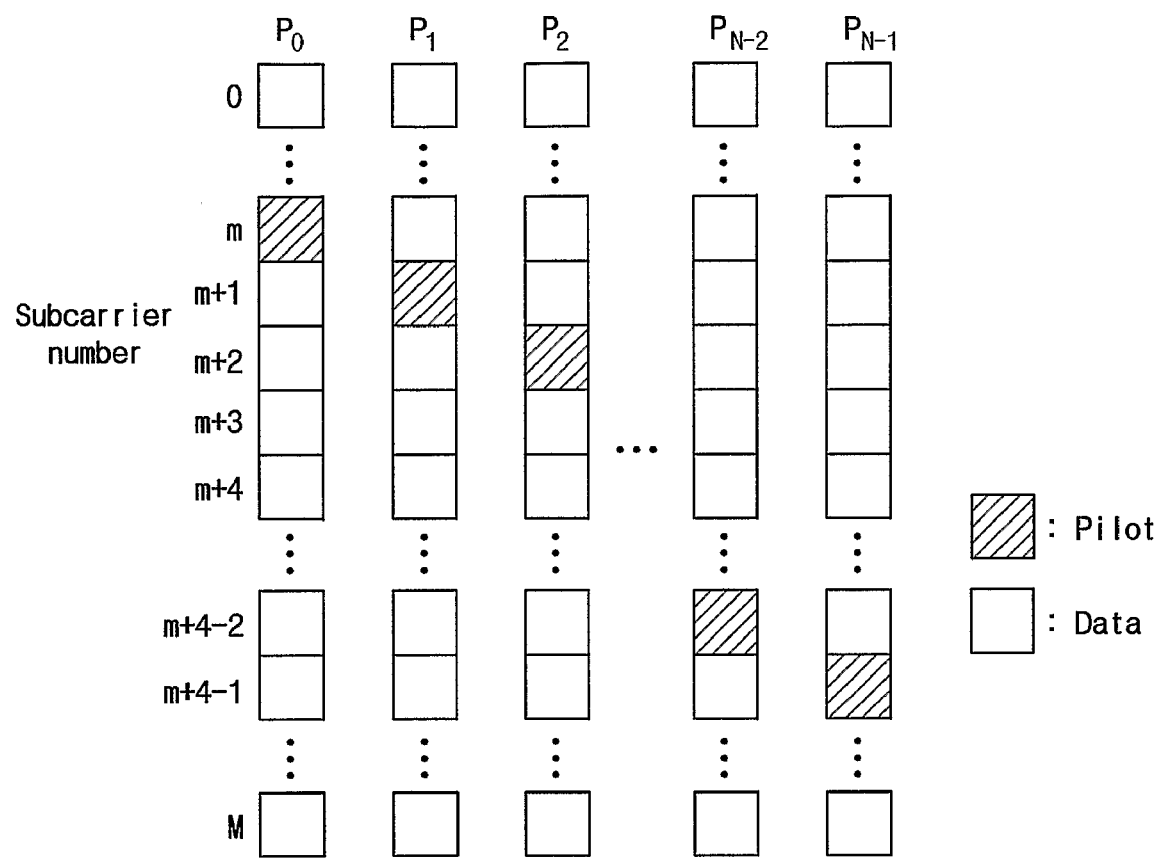
FIG. 4 shows a basic pilot pattern according to partition of whole subcarriers according to a first preferred embodiment of the present invention.

FIG. 4 shows a basic pilot pattern according to partition of whole subcarriers according to a first preferred embodiment of the present invention.

An OFDM system divides an uplink (an available bandwidth) channel into a plurality of subcarriers and transmits them. As shown in FIG. 4, an uplink pilot pattern in the OFDM system has N basic pilot patterns.

The basic pilot pattern includes M adjacent subcarriers, and a pilot is provided in the M subcarriers.

Given that a cgn (carrier group number) of each group=0, $D(gn,sn)$ in a basic pilot pattern $P_{D(gn,sn)}$ is given as Equation 1.

$$D(gn,sn)=(gn+sn) \bmod N \ gn=0,1,\ldots,N-1$$

$$D(gn,sn)=(gn \bmod N+sn*1) \bmod N \ gn=N,N+1,\ldots,2N-1$$

$$D(gn,sn)=(gn \bmod N+sn*2) \bmod N \ gn=2N,2N+1,\ldots,3N-1 \ldots$$

$$D(gn,sn)=(gn \bmod N+sn*(N-1)) \bmod N \ gn=(N-1)*N, (N-1)*N+1,\ldots,N*N-1 \quad \text{Equation 1}$$

where gn is a group number (gn=0,1,2, ... ,N*N−1), sn is a symbol number (sn=0,1,2, ... ,S−1), cn is a cell number, and sgn is a subcarrier group number (sgn=0,1,2, ... ,Q−1). A subcarrier group includes M subcarriers.

$F(gn,sn,cn,sgn)$ in the pilot pattern $P_{F(gn,sn,cn,sgn)}$ caused by gn,sn,cn,sgn is given in Equation 2.

$$F(gn,sn,cn,sgn)=(D(gn,sn)+sgn*cn) \bmod N \quad \text{Equation 2}$$

That is, the positions of the pilots are determined according to Equations 1 and 2.

Figure 5:
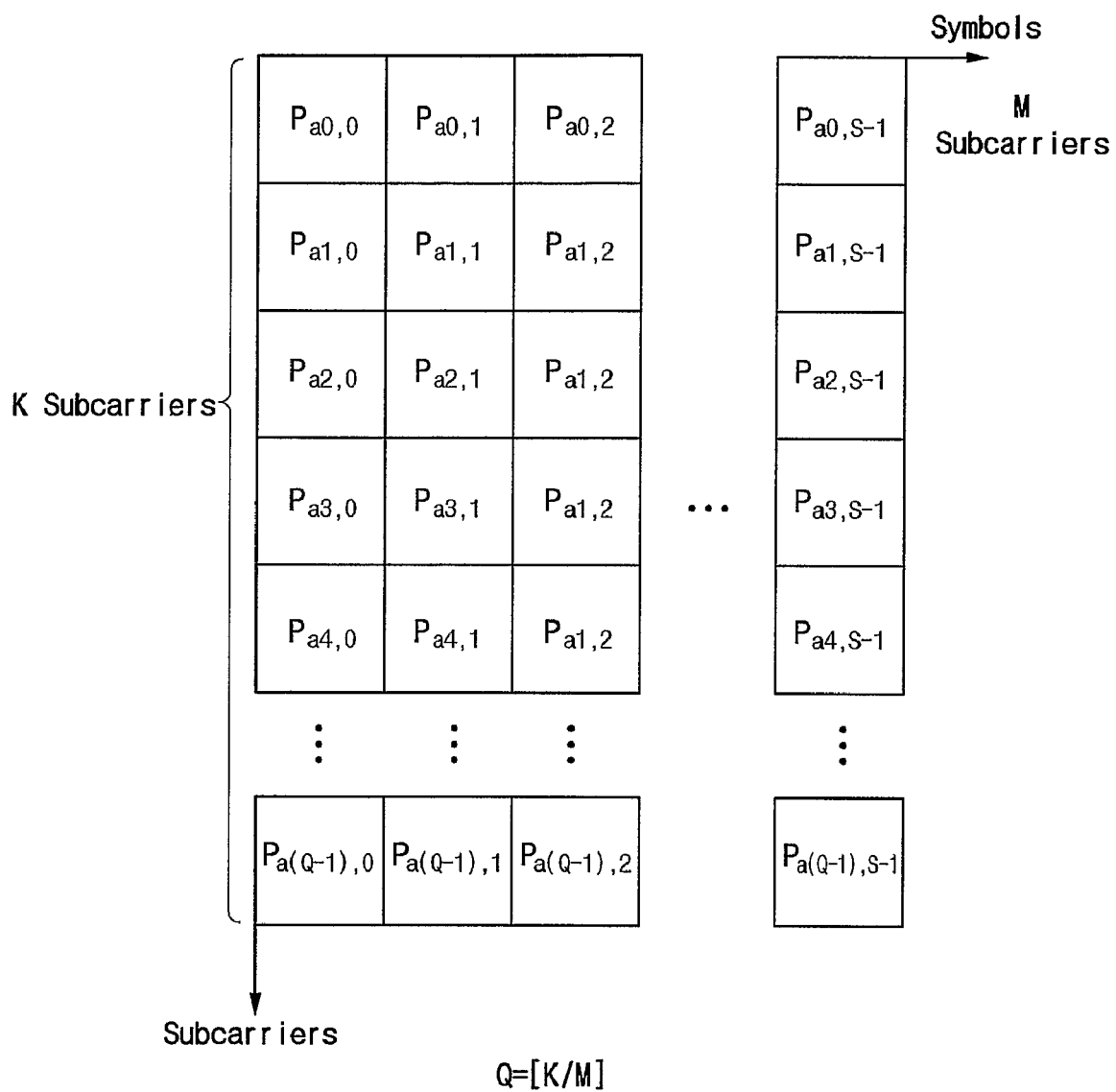
FIG. 5 shows a configuration diagram of an uplink frame formed by combination of basic pilot patterns according to FIG. 4.

FIG. 5 shows a configuration diagram of an uplink frame formed by combination of basic pilot patterns according to FIG. 4.

The subscripts ax,s in Pax,s represents $F(gn,sn,cn,sgn)$. The above-noted Q uses prime numbers so as to reduce collision probabilities between adjacent cell users.

Q subcarrier groups per symbol can be allocated to each terminal, and at least one subcarrier group can be allocated to each terminal.

A base station can allocate w symbols greater than two symbols to the terminal so as to easily perform channel estimation for compensating delay spread.

When a basic allocation unit of a terminal including a subcarrier group and s symbols is defined as a subchannel, at least one subchannel can be allocated to the terminal, and the terminal hops the subchannel and obtains a frequency gain. The RS code having a length Q−1 of a subchannel is used to hop the subcarrier groups. The numbers sgn and sn are varied depending on the terminals in the subchannel allocated to the terminals.

When a basic RS code is given as rs(b), the RS code which corresponds to respective base stations is given as Equation 3.

$$rs_{cn}(b)=(rs(b)+gn*N+cn) \bmod Q \text{ where} \\ b=0,1,\ldots,Q-2. \quad \text{Equation 3}$$

The hopping pattern of the subchannel of each base station is given as Equation 4.

$$S_{hopping}(sn,b)=rs_{cn}((b+\text{Off}*\lfloor sn/w \rfloor) \bmod Q) \quad \text{Equation 4}$$

where Off is an offset value to the frequency domain for obtaining frequency diversity when the subchannels are hopped for each unit of w symbols.

A pilot subcarrier boosts power, and enables channel estimation in the case of collision with data at the adjacent cell.

A collision probability of between specific terminals between the adjacent base stations is $1/Q$, and a probability of collision to the pilot of the corresponding subcarrier is $1/(Q*N)$.

Figure 6:
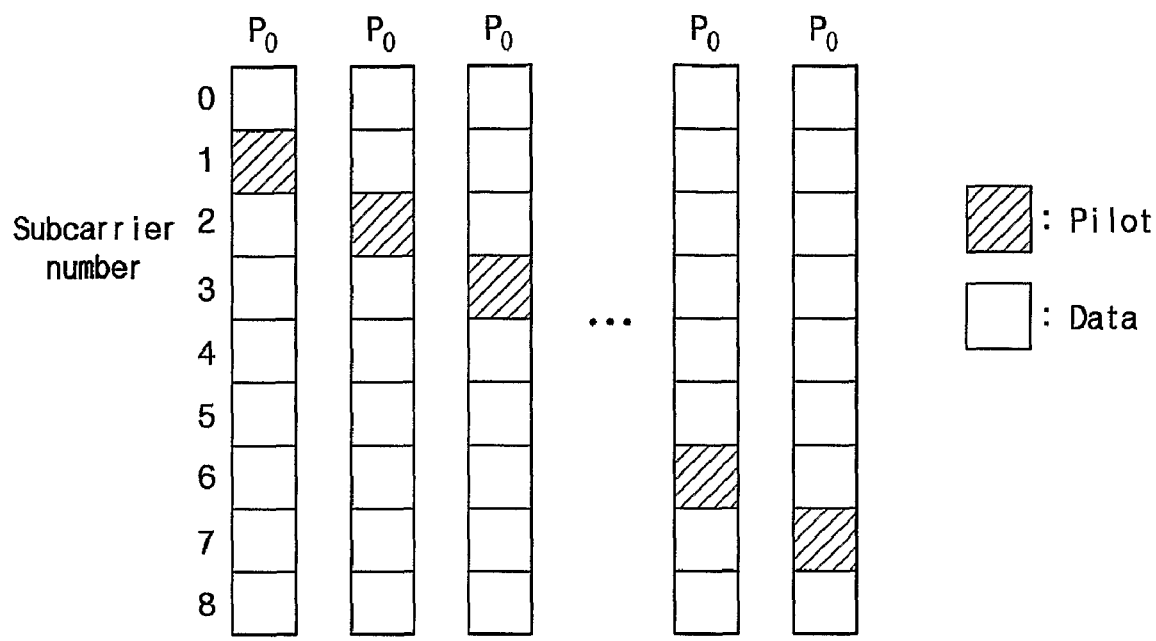
FIG. 6 shows a basic pilot pattern according to a second preferred embodiment of the present invention.

FIG. 6 shows a basic pilot pattern according to a second preferred embodiment of the present invention.

As shown, the uplink pilot pattern is allocated by using N(=7) basic pilot patterns having M(=9) subcarriers.

$$D(gn,sn)=(gn+sn*3) \bmod 7 \ gn=0,1,2,3,4,5,6$$

$$D(gn,sn)=(gn \bmod 7+sn*2) \bmod 7 \ gn=7,8,9,10,11,12,13$$

$$D(gn,sn)=(gn \bmod 7+sn*4) \bmod 7 \ gn=14,15,16,17,18 \quad \text{Equation 5}$$

where the values of 3, 2, and 4 in sn*3, sn*2, and sn*4 are varied from 0 to 6, and more accurate channel estimation can be performed when more than two continuous symbols are allocated to a terminal.

Figure 7:
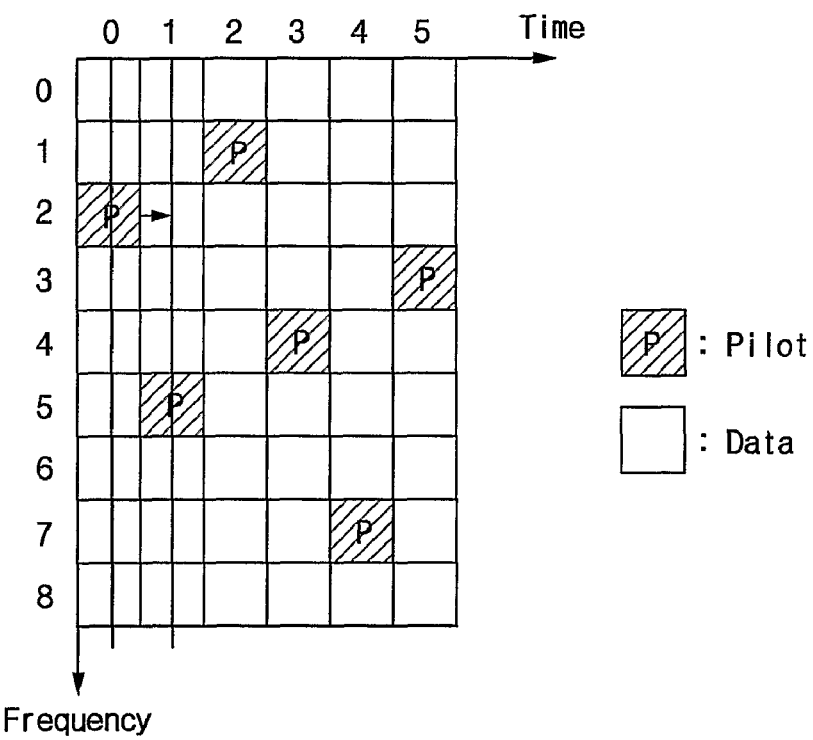
FIG. 7 shows channel estimation according to a third preferred embodiment of the present invention.

FIG. 7 shows channel estimation according to a third preferred embodiment of the present invention.

As shown, when the identical subcarrier group is allocated by more than a unit of two symbols, positions of the intersymbol pilots are different, and hence, the channel of the second subcarrier of the 0th symbol is estimated by using this, the channel of the fifth subcarrier of the first symbol is estimated, and the second and fifth channel estimates are used to perform interpolation for the purpose of channel estimation on the frequency axis. That is, the values of 2, 3, and 4 are selected from the value of from 0 to 6 in consideration of desired number of base stations.

Tables 1 to 3 show relation between gn and sn based on Equation 5.

Table 1 shows the relation between gn(=0, 1, 2, ..., 6) and sn when sgn=0.

TABLE 1

| | sn | | | | | |
|---|---|---|---|---|---|---|
| gn | 0 | 1 | 2 | 3 | 4 | 5 |
| 0 | $P_0$ | $P_3$ | $P_6$ | $P_2$ | $P_5$ | $P_1$ |
| 1 | $P_1$ | $P_4$ | $P_0$ | $P_3$ | $P_6$ | $P_2$ |
| 2 | $P_2$ | $P_5$ | $P_1$ | $P_4$ | $P_0$ | $P_3$ |
| 3 | $P_3$ | $P_6$ | $P_2$ | $P_5$ | $P_1$ | $P_4$ |
| 4 | $P_4$ | $P_0$ | $P_3$ | $P_6$ | $P_2$ | $P_5$ |
| 5 | $P_5$ | $P_1$ | $P_4$ | $P_0$ | $P_3$ | $P_6$ |
| 6 | $P_6$ | $P_2$ | $P_5$ | $P_1$ | $P_4$ | $P_0$ |

Table 2 shows the relation between gn(=7, 8, 9, ..., 13) and sn when sgn=0.

TABLE 2

| | sn | | | | | |
|---|---|---|---|---|---|---|
| gn | 0 | 1 | 2 | 3 | 4 | 5 |
| 7 | $P_0$ | $P_2$ | $P_4$ | $P_6$ | $P_1$ | $P_3$ |
| 8 | $P_1$ | $P_3$ | $P_5$ | $P_0$ | $P_2$ | $P_4$ |
| 9 | $P_2$ | $P_4$ | $P_6$ | $P_1$ | $P_3$ | $P_5$ |
| 10 | $P_3$ | $P_5$ | $P_0$ | $P_2$ | $P_4$ | $P_6$ |
| 11 | $P_4$ | $P_6$ | $P_1$ | $P_3$ | $P_5$ | $P_0$ |
| 12 | $P_5$ | $P_0$ | $P_2$ | $P_4$ | $P_6$ | $P_1$ |
| 13 | $P_6$ | $P_1$ | $P_3$ | $P_5$ | $P_0$ | $P_2$ |

Table 3 shows the relation between gn(=14, 15, 16, ..., 18) and sn when sgn=0.

TABLE 3

| | sn | | | | | |
|---|---|---|---|---|---|---|
| gn | 0 | 1 | 2 | 3 | 4 | 5 |
| 14 | $P_0$ | $P_4$ | $P_1$ | $P_5$ | $P_2$ | $P_6$ |
| 15 | $P_1$ | $P_5$ | $P_2$ | $P_6$ | $P_3$ | $P_0$ |
| 16 | $P_2$ | $P_6$ | $P_3$ | $P_0$ | $P_4$ | $P_1$ |
| 17 | $P_3$ | $P_0$ | $P_4$ | $P_1$ | $P_5$ | $P_2$ |
| 18 | $P_4$ | $P_1$ | $P_5$ | $P_2$ | $P_6$ | $P_3$ |

In consideration of the relation between cn and sgn, F(gn, sn,cn,sgn) is given as Equation 6.

$$F(gn, sn, cn, sgn) = (D(gn,sn) + sgn*cn) \mod 7 \quad \text{Equation 6}$$

Table 4 shows the relation between cn and sgn when gn=0 and sn=0.

TABLE 4

| | cn | | | | | | |
|---|---|---|---|---|---|---|---|
| sgn | 0 | 1 | 2 | 3 | 4 | 5 | 6 |
| 0 | $P_0$ | $P_0$ | $P_0$ | $P_0$ | $P_0$ | $P_0$ | $P_0$ |
| 1 | $P_0$ | $P_1$ | $P_2$ | $P_3$ | $P_4$ | $P_5$ | $P_6$ |
| 2 | $P_0$ | $P_2$ | $P_4$ | $P_6$ | $P_1$ | $P_3$ | $P_5$ |
| 3 | $P_0$ | $P_3$ | $P_6$ | $P_2$ | $P_5$ | $P_1$ | $P_4$ |
| 4 | $P_0$ | $P_4$ | $P_1$ | $P_5$ | $P_2$ | $P_6$ | $P_3$ |
| 5 | $P_0$ | $P_5$ | $P_3$ | $P_1$ | $P_6$ | $P_4$ | $P_2$ |
| 6 | $P_0$ | $P_6$ | $P_5$ | $P_4$ | $P_3$ | $P_2$ | $P_1$ |

TABLE 4-continued

| | cn | | | | | | |
|---|---|---|---|---|---|---|---|
| sgn | 0 | 1 | 2 | 3 | 4 | 5 | 6 |
| 7 | $P_0$ | $P_0$ | $P_0$ | $P_0$ | $P_0$ | $P_0$ | $P_0$ |
| ... | | | | | | | |
| 177 | $P_0$ | $P_2$ | $P_4$ | $P_6$ | $P_1$ | $P_3$ | $P_5$ |
| 178 | $P_0$ | $P_3$ | $P_6$ | $P_2$ | $P_5$ | $P_1$ | $P_4$ |

Table 5 shows the relation between sgn and sn when gn=1 and cn=1.

TABLE 5

| | sn | | | | | |
|---|---|---|---|---|---|---|
| sgn | 0 | 1 | 2 | 3 | 4 | 5 |
| 0 | $P_1$ | $P_4$ | $P_0$ | $P_3$ | $P_6$ | $P_2$ |
| 1 | $P_2$ | $P_5$ | $P_1$ | $P_4$ | $P_0$ | $P_3$ |
| 2 | $P_3$ | $P_6$ | $P_2$ | $P_5$ | $P_1$ | $P_4$ |
| 3 | $P_4$ | $P_0$ | $P_3$ | $P_6$ | $P_2$ | $P_5$ |
| 4 | $P_5$ | $P_1$ | $P_4$ | $P_0$ | $P_3$ | $P_6$ |
| 5 | $P_6$ | $P_2$ | $P_5$ | $P_1$ | $P_4$ | $P_0$ |
| 6 | $P_0$ | $P_3$ | $P_6$ | $P_2$ | $P_5$ | $P_1$ |
| 7 | $P_1$ | $P_4$ | $P_0$ | $P_3$ | $P_6$ | $P_2$ |
| ... | | | | | | |
| 177 | $P_2$ | $P_5$ | $P_1$ | $P_4$ | $P_0$ | $P_3$ |
| 178 | $P_3$ | $P_6$ | $P_2$ | $P_5$ | $P_1$ | $P_4$ |

Table 6 shows the relation between sgn and sn when gn=1 and cn=3.

TABLE 6

| | sn | | | | | |
|---|---|---|---|---|---|---|
| sgn | 0 | 1 | 2 | 3 | 4 | 5 |
| 0 | $P_1$ | $P_3$ | $P_5$ | $P_0$ | $P_2$ | $P_4$ |
| 1 | $P_4$ | $P_6$ | $P_1$ | $P_3$ | $P_5$ | $P_0$ |
| 2 | $P_0$ | $P_2$ | $P_4$ | $P_6$ | $P_1$ | $P_3$ |
| 3 | $P_3$ | $P_5$ | $P_0$ | $P_2$ | $P_4$ | $P_6$ |
| 4 | $P_6$ | $P_1$ | $P_3$ | $P_5$ | $P_0$ | $P_2$ |
| 5 | $P_2$ | $P_4$ | $P_6$ | $P_1$ | $P_3$ | $P_5$ |
| 6 | $P_5$ | $P_0$ | $P_2$ | $P_4$ | $P_6$ | $P_1$ |
| 7 | $P_1$ | $P_3$ | $P_5$ | $P_0$ | $P_2$ | $P_4$ |
| ... | | | | | | |
| 177 | $P_4$ | $P_6$ | $P_1$ | $P_3$ | $P_5$ | $P_0$ |
| 178 | $P_0$ | $P_2$ | $P_4$ | $P_6$ | $P_1$ | $P_3$ |

For example, the number of distinguishable base stations is 18*7+2=128 in the case of using cn=0 and 1 given that gn=18.

In this instance, the sgn (subcarrier group number) is given as Q=179 assuming that the available cn (carrier number) is K=1611.

As to the subchannels allocated to the terminal, at least one subcarrier group is allocated on the frequency axis, and the subchannels are allocated by a w(=2) symbol unit on the time axis.

In order to continuous collisions, the terminal uses the RS codes of the length of 178 and generates hopping patterns based on the above-noted minimum unit.

For example, the 178 RS code is given as follows.

{176, 9, 152, 81, 115, 13, 140, 117, 7, 158, 63, 169, 30, 89, 91, 85, 103, 49, 32, 83, 109, 31, 86, 100, 58, 5, 164, 45, 44, 47, 38, 65, 163, 48, 35, 74, 136, 129, 150, 87, 97, 67, 157, 66, 160, 57, 8, 155, 72, 142, 111, 25, 104, 46, 41, 56, 11, 146, 99, 61, 175, 12, 143, 108, 34, 77, 127, 156, 69, 151, 84, 106, 40, 59, 2, 173, 18, 125, 162, 51, 26, 101, 55, 14, 137, 126, 159, 60, 178, 3, 170, 27, 98, 64, 166, 39, 62, 172, 21, 116, 10, 149, 90, 88, 94, 76, 130, 147, 96, 70, 148, 93, 79, 121, 174, 15, 134, 135, 132, 141, 114, 16, 131, 144, 105, 43, 50, 29, 92, 82, 112, 22, 113, 9, 122, 171, 24, 107, 37, 68, 154, 75, 133, 138, 123, 168, 33, 80, 118, 4, 167, 36, 71, 145, 102, 52, 23, 110, 28, 95, 73, 139, 120, 177, 6, 161, 54, 17, 128, 153, 78, 124, 165, 42, 53, 20, 119, 1}

When the basic RS code is defined as rs(b), the RS codes corresponding to the respective base stations are given as:

$$rs_{cn}(b) = (rs(b) + gn*7 + cn) \mod 179 \text{ where } b=0,1,\ldots,177.$$

Also, the hopping pattern of the subchannel is given below.

$$S_{hopping}(sn, b) = rs_{cn}((b + 24*\lfloor sn/2 \rfloor) \mod 179) \text{ where } \text{Off}=24.$$

When the terminal transmits data over six symbols, the collision probability of between specific terminals between the adjacent base stations is 1/179, and the collision probability to the pilot of the corresponding subcarrier is 1/(179*7).

For example, the terminal in a bad channel state allocates data over six symbols, thereby averaging the amount of interference, and the terminal in a good channel state allocates data over one to two symbols, thereby reducing delay caused by decoding. Also, the terminal estimates the channel when a collision with adjacent cells is generated through boosting by the pilot.

Next, referring to FIG. 8, a transmitter and receiver of the OFDM system will be described in detail.

Figure 8:
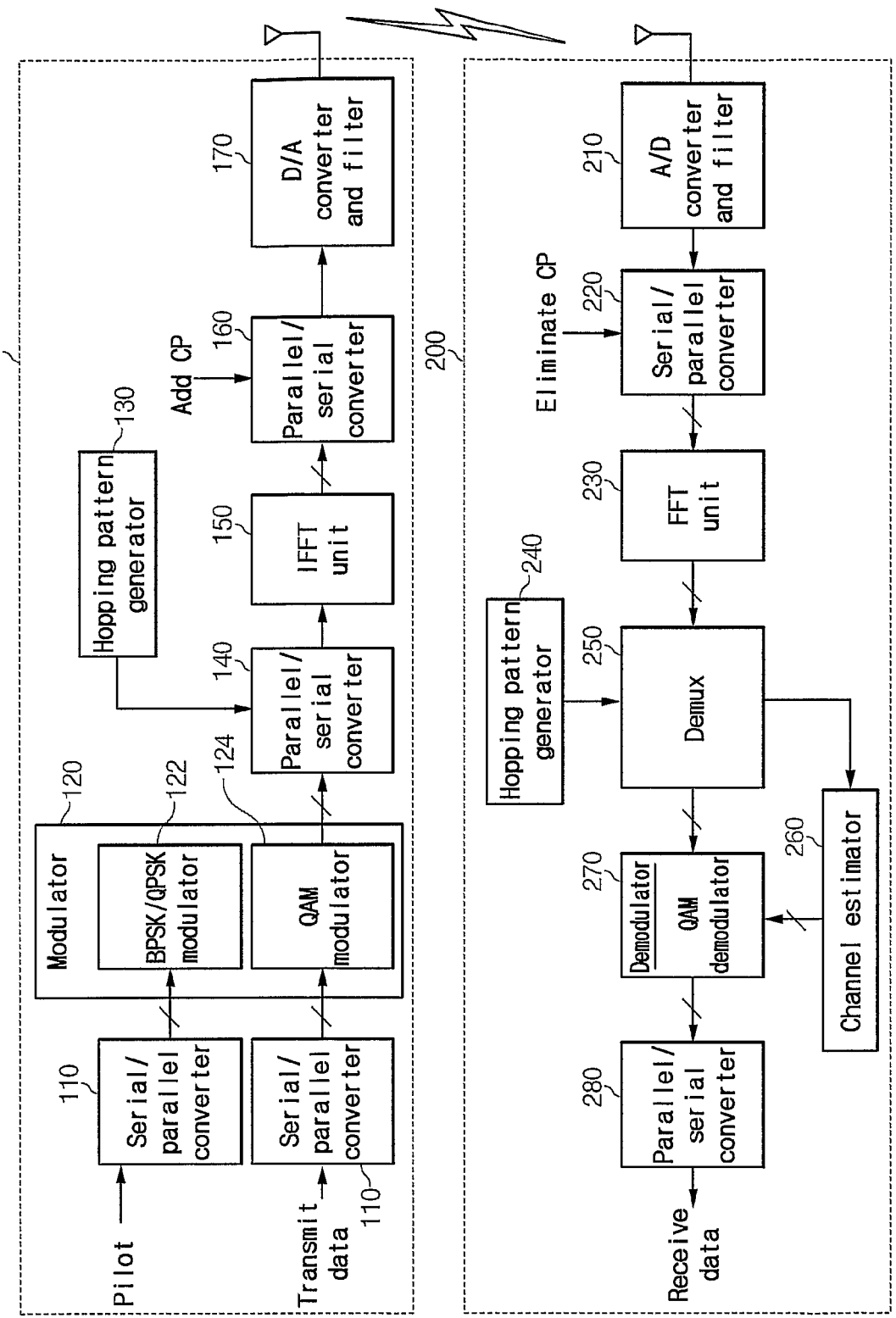
FIG. 8 shows a block diagram for a transmitter and receiver of an OFDM system according to a preferred embodiment of the present invention.

FIG. 8 shows a block diagram for a transmitter and receiver of an OFDM system according to a preferred embodiment of the present invention.

As shown in FIG. 8, the OFDM transmitter 100 comprises a serial/parallel converter 110, a modulator 120, a hopping pattern controller 130, a multiplexer 140, an IFFT unit 150, a parallel/serial converter 160, and a D/A converter and filter 170.

The serial/parallel converter 110 converts high-speed transmit data received in series into low-speed parallel data, and converts pilots received in series into parallel data.

The modulator 120 modulates the parallel-converted and input data and pilots according to a predefined modulation method.

The QAM method is used for the data by a QAM modulator 124, and the BPSK or QPSK modulation method is used for the pilots by a BPSK or QPSK modulator 122 in FIG. 8, but without being restricted to this, one of 1-bit BPSK, 2-bit QPSK, 4-bit 16 QAM, 6-bit 64 QAM, and 8-bit 256 QAM can be used for the modulation method used by the subcarriers according to an amount of data transmittable by a single subcarrier in the IEEE802.11a.

The hopping pattern controller 130 hops the subcarrier group according to a specific hopping pattern, allocates data, and allocates pilots so that the positions of the pilots per subcarrier group may be different according to the default pilot pattern. The hopping pattern controller 130 transmits information caused by the allocated data and pilots to the receiver. The base stations are distinguishable by the allocation of data and pilots.

The multiplexer 140 inserts pilots into the data output by the modulator 120 according to the data and pilots allocated by the hopping pattern controller 130, multiplexes them, and outputs them as a single signal.

The IFFT unit 150 performs an IFFT on the signals output by the multiplexer 140 into temporal signals. In order to prevent OFDM inter-symbol interference output by the IFFT unit 150, a CP is provided to the parallel/serial converter 160 so that the CP may be additionally inserted between the adjacent OFDM symbols by establishing a length of the CP to be greater than the maximum delay spreading of a channel.

The parallel/serial converter 160 converts the OFDM symbols of the parallel signals to which the CP is added into serial signals, and outputs the serial signals.

The D/A converter and filter 170 converts the digital signals converted as serial signals into analog signals, filters the analog signals, and outputs filtered results to the receiver 200 through the RF terminal.

Next, the OFDM receiver 200 comprises an A/D converter and filter 210, a serial/parallel converter 220, an FFT unit 230, a hopping pattern controller 240, a demultiplexer 250, a channel estimator 260, a demodulator 270, and a parallel/serial converter 280.

The A/D converter and filter 210 receives the analog signals with the inserted CP from the transmitter 10, filters the received signals, and converts them into digital signals.

The serial/parallel converter 220 eliminates the CP from the OFDM symbols, and converts them into parallel signals.

The FFT unit 230 performs an FFT on the parallel signals converted by the serial/parallel converter 220, and converts time domain signals into frequency domain symbols.

The hopping pattern controller 240 receives information on the allocation of data and pilots from the transmitter, detects positions of the data and the pilots from the frequency domain signals output by the FFT unit 230, and reversely hops the frequency domain signals output by the FFT unit 230 from the detected data positions.

The demultiplexer 250 receives frequency domain symbols output by the FFT 230, separates the symbols into data and pilots according to positions of the data and the pilots detected by the hopping pattern controller 240, and outputs separated results.

The channel estimator 260 receives the pilots output by the demultiplexer 250, and estimates channels of the received signals.

The demodulator 270 uses the channel estimates, uses the QAM method which corresponds to the data modulation method of the modulator 120 of the transmitter 100, and demodulates the data.

The parallel/serial converter 280 converts the demodulated parallel signals into serial signals.

According to the preferred embodiments of the present invention, performance degradation caused by time is reduced, the probability of pilot collision between adjacent cells is reduced, and accuracy of channel estimation is increased through boosting the pilot subcarrier power.

Also, since the distinguishable cells have specific data pilot allocation methods, distinguishing of base stations and reuse rates of frequency are improved.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for allocating pilots and data to an uplink channel in an OFDMA (orthogonal frequency division multiple access) system, comprising:

i) partitioning subcarrier groups and symbols from the uplink channels based on a basic pilot pattern generated by a specific reference, and allocating at least one subchannel based on the partitioned subcarrier groups and the symbols;

ii) hopping the subcarrier groups according to a hopping pattern, and allocating data, the subcarrier groups being caused by the subchannel to allocated in step i); and iii) differently allocating the pilot per subcarrier group based on the basic pilot pattern from the data hopped in step ii), wherein the hopping pattern is generated using an RS code with a same length as that of the subchannel, the RS code being allocated to a corresponding base station based on a number of the subcarrier groups, a basic RS code, a group number, and a cell number.

2. The method of claim 1, wherein the subcarrier groups are partitioned by a prime number.

3. The method of claim 1, wherein the subchannel allocated in step i) is allocated by at least one subcarrier group on a frequency axis, and by a unit of more than two symbols on a time axis.

4. The method of claim 1, wherein the RS code is allocated to the corresponding base station based on:

$$rs_{cn}(b)=(rs(b)+gn*N+cn) \bmod Q)$$

where b=0,1, . . . ,Q-2, Q is the number of the subcarrier groups, rs(b) is the basic RS code, rscn(b) is an RS code according to the cell number within a cell, gn is the group number, and cn is the cell number.

5. The method of claim 1, wherein the hopping pattern follows:

$$S_{hopping}(sn,b)=rs_{cn}((b+\text{off}*\lfloor su/w \rfloor) \bmod Q)$$

where Off is an offset value to the frequency domain for obtaining s frequency diversity when the subchannels are hopped for each unit of w symbols, sn is a number of symbols, Q is a number of subcarrier groups per symbol, and $rs_{cn}(b)$ is an RS code according to a cell number within a group.

6. The method of claim 1, wherein step iii) comprises:
a) partitioning the bandwidth of the uplink channel into a plurality of subcarrier groups having a specific number of subcarriers; and
b) allocating a pilot to each subcarrier group, wherein a basic pilot pattern with a different pilot position is generated to each subcarrier group.

7. The method of claim 6, wherein the pilot is allocated according to the subsequent equation, and the base station is distinguished based on the allocated pilot, $$F(gn,sn,cn,sgn)=(D(gn,sn)+sgn*cn) \bmod N$$

where sgn is a set of continuous adjacent carriers and it is a subcarrier group number, cn is the cell number, sn is a symbol number, gn is the group number, and D (gn,sn) is a function value according to gn and sn for generating the position of the pilot.

8. The method of claim 7, wherein the D(gn,sn) is found by the following:

$$D(gn,sn)=(gn+sn) \bmod N \; gn=0,1,\ldots,N-1$$

$$D(gn,sn)=(gn \bmod N+sn*1) \bmod N \; gn=N,N+1,\ldots,2N-1$$

$$D(gn,sn)=(gn \bmod N+sn*2) \bmod N \; gn=2N,2N+1,\ldots,3N-1$$

. . .

$$D(gn,sn)=(gn \bmod N+sn*(N-1)) \bmod N \; gn=(N-1)*N, (N-1)*N+1,\ldots,N*N-1$$

where gn is a group number (gn=0,1,2, . . . ,N*N-1), and sn is a symbol number (sn=0,1,2, . . . ,S-1.

9. A method for a transmitter to transmit pilot-inserted transmit data to a receiver through an uplink channel in an OFDMA (orthogonal frequency division multiple access) system, comprising:
a) receiving a specific subcarrier group and a subchannel of a specific symbol unit by a specific reference, hopping the specific subcarrier group according to a specific hopping pattern to allocate data, and allocating pilots based on a specific pilot pattern from the allocated data;
b) transmitting information according to the allocated data and pilots; and
c) transmitting the pilot-inserted transmit data to the receiver,
wherein the hopping pattern is generated using an RS code with a same length as that of the subchannel, the RS code being allocated to a corresponding base station based on a number of the subcarrier groups, a basic RS code, a group number, and a cell number.

10. The method of claim 9, wherein step a) comprises receiving a subcarrier group and a subchannel with more than two continuous symbols.

11. The method of claim 9, wherein step b) comprises:
d) converting the data and the pilots into respective parallel signals according to the data to be transmitted and the number of pilot subcarriers;
e) respectively modulating the parallel data and signals converted in step d); and
f) receiving the data and the pilot modulated in step e), performing an IFFT as (inverse fast Fourier transform) on the pilot-inserted data based on the data and the pilots allocated in step a), and converting then into time domain signals.

12. The method of claim 11, wherein step c) comprises:
adding a cyclic prefix to the time domain signals converted in step f), and converting them into serial signals; and
converting the serial signals into analog signals, filtering the analog signals, and transmitting the filtered signals to the receiver.

13. A method for receiving pilot-inserted data from a transmitter through an uplink channel in an OFDMA (orthogonal frequency division multiple to access) system, comprising:
a) converting the data transmitted by the transmitter into frequency domain signals;
b) reversely hopping the frequency domain signals converted in step a) based on information on the data and the pilot transmitted by the transmitter, wherein the information follows the data allocated by hopping a specific subcarrier group from among subcarrier groups partitioned based on a specific basic pilot pattern and follows the pilot allocated from the allocated data based on the specific pilot pattern; and
c) demodulating the reversely hopped data, and receiving them,
wherein the specific subcarrier group is hopped based on a hopping pattern that is generated using an RS code with a same length as that of a subchannel, the RS code being allocated to a corresponding base station based on a number of the subcarrier groups, a basic RS code, a group number, and a cell number.

14. The method of claim 13, wherein step a) comprises:
d) filtering the data transmitted by the transmitter, and converting the filtered data into digital signals;
e) eliminating a cyclic prefix of the digital signal, and converting them into parallel signals; and
f) performing an FFT (fast Fourier transform) on the parallel signals and converting them into frequency domain signals.

15. The method of claim 13, wherein step b) comprises:
g) detecting positions of the data and the pilots based on the information of the data and the pilots;
h) reversely hopping the detected data; and
i) separating the reversely hopped data and pilots based on the positions of the data and the pilots detected in step g).

16. The method of claim 15, wherein step c) comprises:
j) estimating a channel on a frequency axis based on the position of the pilot; and
k) using the channel estimate in step j), and demodulating and receiving the data.

17. The method of claim 16, wherein step j) comprises:
performing channel estimation from a specific subcarrier based on the position of the pilot, and estimating the frequency axis channel by interpolation using the channel estimate.

18. A transmitter for transmitting pilot-inserted transmit data to a receiver through an uplink channel in an OFDMA (orthogonal frequency division multiple access) system, comprising:
a serial/parallel converter for converting data and pilots into parallel go signals according to number of pilots and data subcarriers;
a modulator for modulating the parallel data and pilots converted by the serial/parallel converter;
a hopping pattern controller for receiving a specific subcarrier group and a subchannel of a specific symbol unit by a specific reference, hopping the specific subcarrier group according to a specific hopping pattern to allocate data, allocating pilots based on a specific pilot pattern from the allocated data, and transmitting information caused by the allocated data and pilots to the receiver, wherein the hopping pattern is generated using an RS code which corresponds to a length of the subchannel, and the RS code is allocated to a corresponding base station based on a number of the subcarrier groups, a basic RS code, a group number, and a cell number;
a multiplexer for inserting pilots into the data based on the allocated data and the pilots, and multiplexing them;
an IFFT (inverse fast Fourier transform) unit for converting the multiplexed frequency domain signals into time domain signals, and outputting the same;
a parallel/serial converter for adding a cyclic prefix to the signals output to by the IFFT unit, and converting them into serial signals; and
a digital/analog converter and filter for converting the serial signals output by the parallel/serial converter into analog signals, filtering them, and transmitting the filtered signals to the receiver through an RF (radio frequency) terminal.

19. The transmitter of claim 18, wherein the pilots are allocated to have different positions within the subcarrier group.

20. The transmitter of claim 18, wherein the corresponding base station is distinguished based on the hopping pattern and the pilot pattern.

21. A receiver for receiving pilot-inserted transmit data from a transmitter through an uplink channel in an OFDMA (orthogonal frequency division multiple access) system, comprising:
an A/D (analog/digital) converter and filter for converting the data transmitted by the transmitter into digital signals;
a serial/parallel converter for eliminating a cyclic prefix from the digital signals, and converting them into parallel signals;
an FFT (fast Fourier transform) unit for performing an FFT on the parallel signals, and outputting frequency domain signals;
a hopping pattern controller for receiving information on the data and the pilots transmitted by the transmitter, detecting positions of the data and pilots from the frequency domain signals output through the FFT unit, and reversely hopping the data from the detected positions of the data, wherein the information follows the data allocated by hopping a specific subcarrier group from among the subcarrier groups partitioned based on a specific basic pilot pattern and follows the pilot allocated from the allocated data based on the specific pilot pattern wherein a hopping pattern is generated using an RS code which corresponds to a length of a subchannel, and the RS code is allocated to a corresponding base station based on a number of the subcarrier groups, a basic RS code, a group number, and a cell number;
a demultiplexer for separating the reversely hopped data and pilots based on the positions of the detected data and pilots;
a channel estimator for using the separated pilots and estimating a channel of the separated data;
a demodulator for using the estimated channel estimate and demodulating the separated data; and
a parallel/serial converter for converting the demodulated parallel data into serial data.

* * * * *